US008364381B2

(12) United States Patent
Kar et al.

(10) Patent No.: US 8,364,381 B2
(45) Date of Patent: Jan. 29, 2013

(54) CONTROL SYSTEM AND METHOD FOR IDLE SPEED CONTROL TORQUE RESERVE REDUCTION

(75) Inventors: Krishnendu Kar, South Lyon, MI (US); Daniel Lee Baibak, White Lake, MI (US)

(73) Assignee: GM Global Technology Operations LLC

( * ) Notice: Subject to any disclaimer, the term of this patent is extended or adjusted under 35 U.S.C. 154(b) by 631 days.

(21) Appl. No.: 12/545,318

(22) Filed: Aug. 21, 2009

(65) Prior Publication Data

US 2011/0041802 A1 Feb. 24, 2011

(51) Int. Cl.
*B60T 7/12* (2006.01)

(52) U.S. Cl. ........................................ 701/103; 701/110

(58) Field of Classification Search .................. 701/103, 701/104, 110, 114, 115; 123/319, 327, 406.23
See application file for complete search history.

(56) References Cited

U.S. PATENT DOCUMENTS

| | | | | |
|---|---|---|---|---|
| 5,463,993 | A * | 11/1995 | Livshits et al. | 123/339.2 |
| 2005/0038588 | A1 * | 2/2005 | Shukla | 701/70 |
| 2005/0255964 | A1 * | 11/2005 | Heap et al. | 477/3 |
| 2006/0194670 | A1 * | 8/2006 | Heap et al. | 477/3 |
| 2011/0139117 | A1 * | 6/2011 | Kar et al. | 123/395 |
| 2011/0195817 | A1 * | 8/2011 | Whitney et al. | 477/121 |

* cited by examiner

*Primary Examiner* — John Kwon

(57) ABSTRACT

A control system for an engine includes a speed error determination module that periodically determines an engine speed error rate based on a difference between a measured speed and a desired speed of the engine, and a torque reserve module that monitors the engine speed error rate and that selectively adjusts a torque reserve of the engine based on the engine speed error rate. The torque reserve module maintains the torque reserve at a predetermined first torque reserve amount while the engine speed error rate is less than a predetermined first error rate and selectively increases the torque reserve above the first torque reserve amount when the engine speed error rate increases above a predetermined second error rate greater than the first error rate. The torque reserve module decreases the torque reserve when the engine speed error rate decreases below the first error rate. A related method is also provided.

16 Claims, 7 Drawing Sheets

CONTROL SYSTEM AND METHOD FOR IDLE SPEED CONTROL TORQUE RESERVE REDUCTION

FIELD

The present disclosure relates to control systems and methods for controlling a torque output of an internal combustion engine, and more particularly, to control systems and methods for controlling a torque reserve of the engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motor vehicles typically include an engine system that produces drive torque that is transmitted through a transmission to a drivetrain to drive wheels of the vehicle. The engine system may include an internal combustion engine that combusts an air and fuel mixture within cylinders to drive pistons, which produces the drive torque. Air flow into engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. The desired torque may be based on one or more driver inputs, such as an accelerator pedal position. The engine control systems may include one or more electronic control modules that control engine torque output by controlling operation of one or more actuators, such as a throttle actuator that controls the throttle to achieve the desired torque. The electronic control modules may control operation based on one or more operating conditions of the engine, such as engine speed. During periods when the driver removes his or her foot from the accelerator pedal, such as when the vehicle is idling or coasting down from a higher speed, the electronic control modules may control engine torque output to achieve a desired engine idle speed.

SUMMARY

In one form, the present disclosure provides a control system for an engine that includes a speed error determination module that periodically determines an engine speed error rate based on a difference between a measured speed of the engine and a desired speed of the engine, and a torque reserve module that monitors the engine speed error rate and that selectively adjusts a torque reserve of the engine based on the engine speed error rate.

In one feature, the torque reserve module maintains the torque reserve at a predetermined first torque reserve amount while the engine speed error rate is less than a predetermined first error rate. In another feature, the torque reserve module selectively increases the torque reserve above the first torque reserve amount when the engine speed error rate increases above a predetermined second error rate greater than the first error rate. In a related feature, the torque reserve module may selectively increase the torque reserve at a predetermined first torque rate while the engine speed error rate remains greater than the first error rate. The torque reserve module may limit the torque reserve to a predetermined second torque reserve amount greater than the first torque reserve amount. In another related feature, the torque reserve module may decrease the torque reserve at a predetermined second torque rate when the engine speed error rate decreases below the first error rate.

In other features, the torque reserve module increases the torque reserve above the first torque reserve amount when enablement conditions are met. The enablement conditions may include one of a group consisting of the measured speed of the engine, an engine coolant temperature, a vehicle speed, and a misfire condition of the engine.

In further features, the torque reserve module selectively adjusts the torque reserve between a predetermined first torque reserve amount and a sum of the first torque reserve amount and a predetermined second torque reserve amount during a first period beginning when the engine speed error rate increases above a predetermined first error rate and ending when the engine speed error rate decreases below a predetermined second error rate less than the first error rate and during a second period after the first period.

In still further features, the first torque reserve amount may be based on a density of intake air of the engine. The engine speed error rate may be determined every firing period of the engine. The difference between the measured speed of the engine and the desired speed of the engine may be a filtered difference. The engine speed error rate may be a filtered engine speed error rate.

In another form, the present disclosure provides a method for an engine that includes periodically determining an engine speed error rate based on a difference between a measured speed of the engine and a desired speed of the engine, monitoring the engine speed error rate, and selectively adjusting a torque reserve of the engine based on the engine speed error rate.

In one feature, the selectively adjusting a torque reserve includes maintaining the torque reserve at a predetermined first torque reserve amount while the engine speed error rate is less than a predetermined first error rate, and selectively increasing the torque reserve above the first torque reserve amount when the engine speed error rate increases above a predetermined second error rate greater than the first error rate. In a related feature, the selectively increasing the torque reserve above the first torque reserve amount may include selectively increasing the torque reserve at a predetermined first torque rate while the engine speed error rate remains greater than the first error rate. The selectively increasing the torque reserve above the first torque reserve amount may further include limiting the torque reserve to a predetermined second torque reserve amount greater than the first torque reserve amount. In another related feature, the method may include decreasing the torque reserve at a predetermined second torque rate when the engine speed error rate decreases below the first error rate.

In other features, the selectively increasing the torque reserve above the first torque reserve amount includes increasing the torque reserve above the first torque reserve amount when enablement conditions are met. The enablement conditions may include one of a group consisting of the measured speed of the engine, an engine coolant temperature, a vehicle speed, and a misfire condition of the engine.

In further features, the selectively adjusting a torque reserve of the engine includes increasing the torque reserve between a predetermined first torque reserve amount and a sum of the first torque reserve amount and a predetermined second torque reserve amount during a first period beginning when the engine speed error rate increases above a predetermined first error rate and ending when the engine speed error rate decreases below a predetermined second error rate less than the first error rate, and decreasing the torque reserve during a second period after the first period.

In still further features, the first torque reserve amount may be based on a density of intake air of the engine. The engine speed error rate may be determined every firing period of the engine. The difference between the measured speed of the engine and the desired speed of the engine may be a filtered difference. The engine speed error rate may be a filtered engine speed error rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
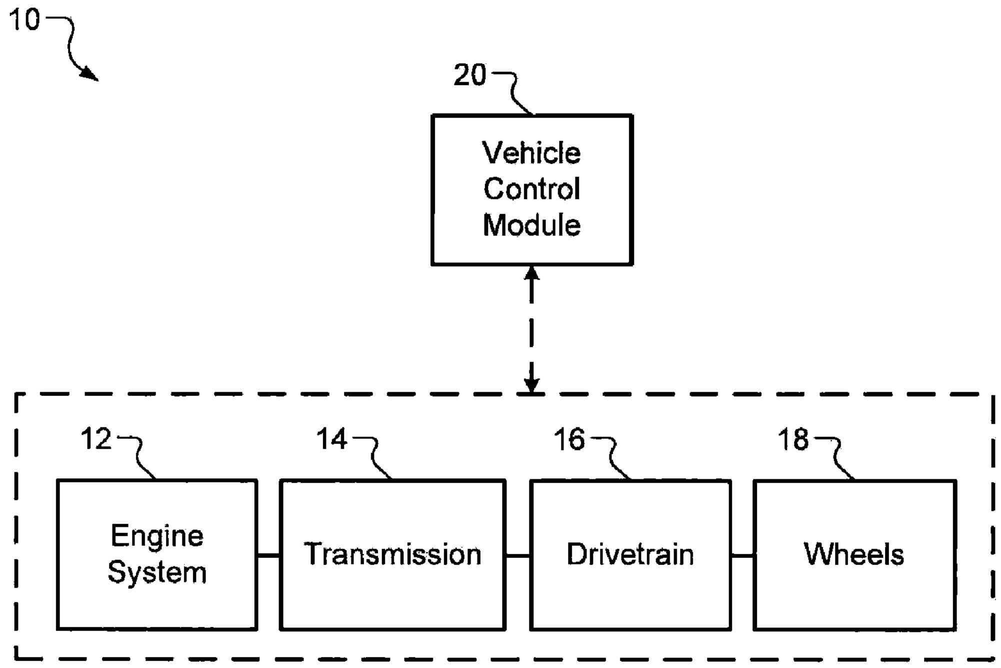
FIG. 1 is a functional block diagram illustrating an exemplary vehicle system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

With particular reference to FIG. 1, an exemplary vehicle system 10 may include an engine system 12 that produces drive torque that is transmitted through a transmission 14 at one or more gear ratios to a drivetrain 16 that drives one or more wheels 18 of the vehicle. The engine system 12 may be a hybrid engine system, as discussed in further detail below. The vehicle system 10 may further include a vehicle control module 20 that regulates operation of one or more components of the vehicle system 10. The vehicle control module 20 may regulate operation by generating control signals based on signals received from various components. The signals may include signals indicating one or more operating conditions of the various components. The vehicle control module 20 may include one or more the modules of the engine system 12 described in further detail below.

Figure 2:
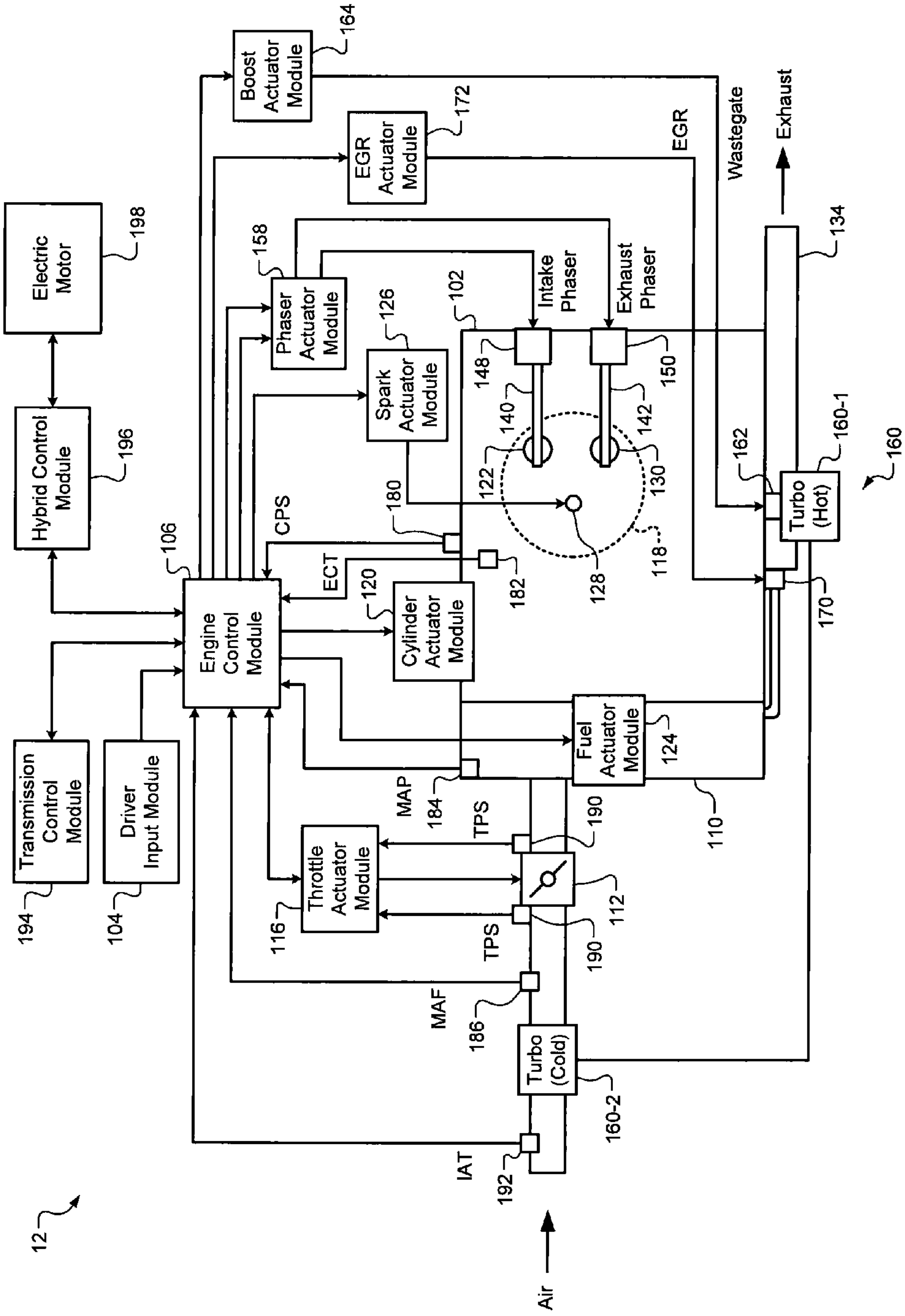
FIG. 2 is a functional block diagram illustrating an exemplary engine system according to the present disclosure.

With particular reference to FIG. 2, a functional block diagram of an exemplary implementation of the engine system 12 according to the present disclosure is presented. The engine system 12 includes an engine 102 that combusts an air/fuel mixture to produce drive torque for the vehicle based on a driver input module 104. An engine control module (ECM) 106 regulates operation of the engine 102 and thereby controls engine torque output.

As discussed in further detail below, the ECM 106 may prepare the engine 102 to produce an engine torque output above a desired torque in order to meet an impending load on the engine that may affect engine torque output. Loads that may affect engine torque output include loads generated by peripheral engine components, such as, but not limited to, an air conditioning (A/C) compressor, an alternator, and a power steering pump that are driven by the engine 102.

The impending load may be a load that is known from signals that control operation of the peripheral engine components. As one example, the impending load may be known where the ECM 106 controls operation of the component. As another example, the impending load may be known by monitoring the signal generated by a switch that triggers operation of the component, such as an A/C switch operated by the driver. As yet another example, the impending load may be known by monitoring a signal generated by a sensor that senses operation of the component, such as a pressure sensor that senses an output pressure of the power steering pump.

The impending load may be unknown where one or more components driven by the engine operate independent of control and there is no sensor that senses the operation of the components. According to the present disclosure, an unknown impending load may be detected by monitoring a rate of change in the difference between a desired engine speed and an actual (i.e., measured) engine speed of the engine. More specifically, the unknown impending load may be detected in the foregoing manner during periods when the engine is operating at idle and/or during periods when the desired torque is low. For example, the desired torque may be low during vehicle coast down or during low vehicle speed maneuvers, such as parking lot maneuvers.

Detecting an impending load according to the present disclosure has the benefit that a sensor that may otherwise be required for the purpose of detecting the impending load may be eliminated. As one non-limiting example, a pressure sensor that may otherwise be required to sense the pressure output by the power steering pump for purposes of detecting the load generated by the power steering pump may be eliminated. The present disclosure has the additional benefit that the engine 102 may be operated at a lower torque reserve during periods when the impending load is not detected. When an unknown impending load is detected the torque reserve of the engine may be increased to manage the load.

Operating the engine at lower torque reserves has the benefit of improving fuel economy by reducing the torque output that the engine 102 is prepared to produce and by reducing the desired engine speed (e.g., idle speed) at which the engine 102 is operated.

With continued reference to FIG. 2, the engine system 12 will now be described in further detail. Air is drawn into an intake manifold 110 through a throttle valve 112. For example only, the throttle valve 112 may include a butterfly valve having a rotatable blade. The ECM 106 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 106 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 106 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 2, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 106, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 106. When implemented, variable valve lift may also be controlled by the phaser actuator module 158.

The engine system 12 may include a boost device that provides pressurized air to the intake manifold 110. For example, FIG. 2 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 106 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 12 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 12 may measure the position and speed of the crankshaft in revolutions per minute (RPM) using a crankshaft position sensor 180 that senses a rotational position of the crankshaft. The crankshaft position sensor 180 may generate a CPS signal indicating the rotational position sensed. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 106 may use signals from the sensors to make control decisions for the engine system 12.

The ECM 106 may communicate with a transmission control module 194 to coordinate shifting gears in a transmission (not shown). For example, the ECM 106 may reduce engine torque during a gear shift. The ECM 106 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 106, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 2, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 106 may control actuator values in order to generate a desired torque from the engine 102.

Figure 3:
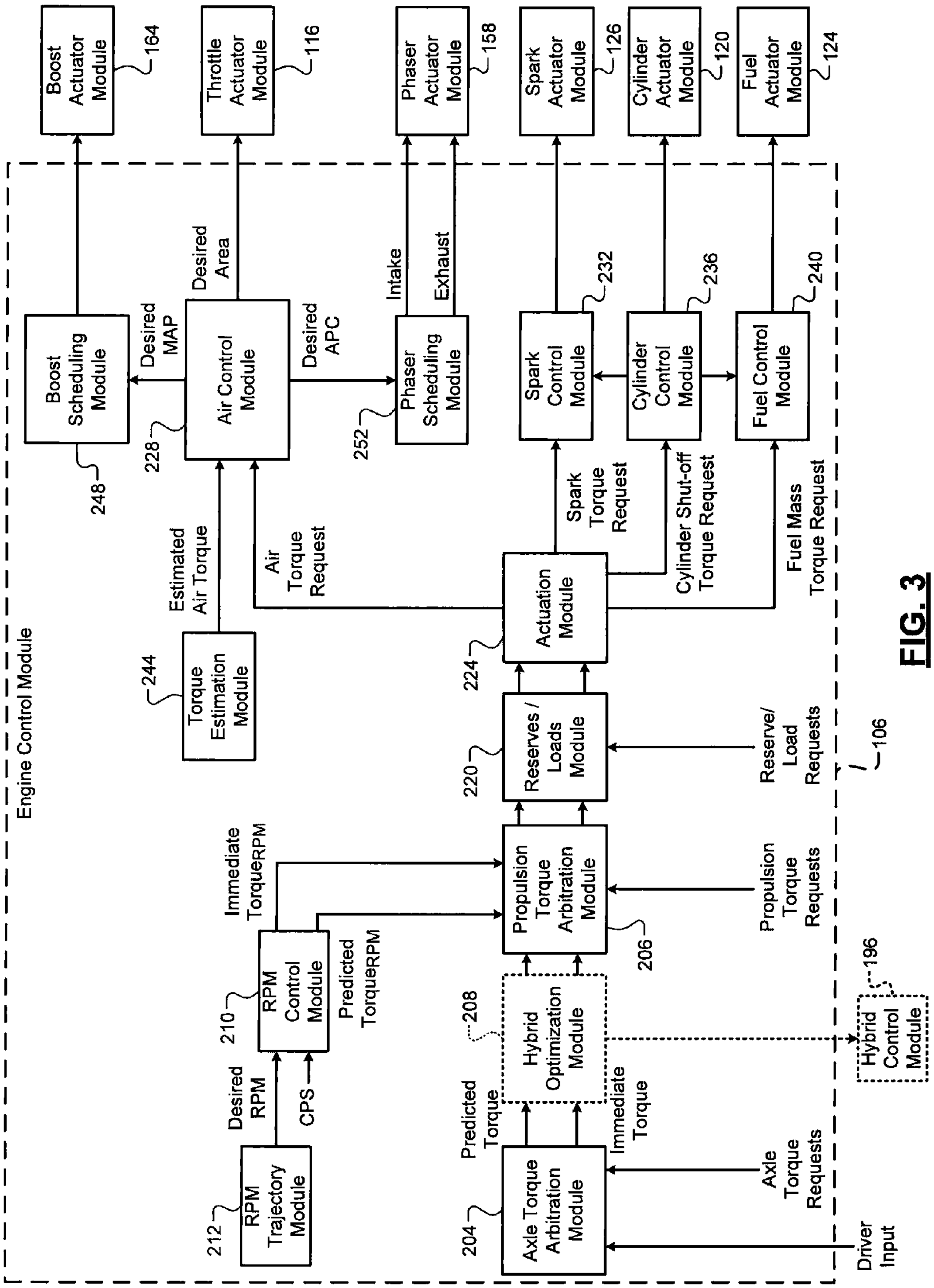
FIG. 3 a functional block diagram illustrating an exemplary engine control system according to the present disclosure.

Referring now to FIG. 3, a functional block diagram of an exemplary engine control system according to the present disclosure is presented. An exemplary implementation of the ECM 106 includes an axle torque arbitration module 204. The axle torque arbitration module 204 arbitrates between a driver input from the driver input module 104 and other axle torque requests. For example, the driver input may be based on a position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems.

The axle torque arbitration module 204 outputs a predicted torque and an immediate torque based on the results of arbitrating between the received torque requests. The predicted torque is the amount of torque that the ECM 106 prepares the engine 102 to generate, and may often be based on the driver's torque request. The immediate torque is the amount of torque that the ECM 106 desires the engine 102 to generate, which may be less than the predicted torque. A torque reserve exists when the immediate torque is less than the predicted torque and may presently be increased to increase engine torque output. Quantitatively, the torque reserve corresponds to the present maximum capability of the immediate torque to be increased.

The ECM 106 may control the actuators of the engine 102 to create torque reserves and to meet temporary torque reduction requests. As discussed herein, torque reserves may be created to manage impending loads on the engine 102. Temporary torque reductions may be requested, for example, when a vehicle speed is approaching an over-speed threshold and/or when the traction control system senses wheel slippage.

Engine torque output equal to the immediate torque may be achieved by varying actuator values for fast engine actuators. The engine 102 may be prepared to generate torque equal to the predicted torque by varying the actuator values for slow engine actuators.

As discussed herein, fast engine actuators are actuators that respond quickly to changes in the actuator values received and do not involve a significant delay in varying the engine torque output in response to changes in the actuator values. Fast actuators include actuators that may be controlled to produce a change in engine torque output during the next combustion event following a change in the actuator value received.

As discussed herein, slow engine actuators are actuators that exhibit a delayed response to changes in the actuator values received and/or involve delays in varying the engine torque output in response to changes in actuator values. The delayed response may result from delays in the operation of the actuator to achieve the engine parameter corresponding to the actuator value. Delays in varying the engine torque output may result from delays inherent in the engine torque output for a particular engine in response to changes in engine parameters.

For example, in a gasoline engine, spark advance may be adjusted to quickly vary engine torque output. As such, the spark actuator module 126 may be a fast actuator. Fueling may be adjusted to quickly vary engine torque output and therefore the fuel actuator module 124 may also be a fast actuator.

Air flow and cam phaser position may be slower to respond because of mechanical lag time and therefore may involve corresponding delays in varying engine torque output. Further, changes in air flow are subject to air transport delays in the intake manifold. Additionally, changes in air flow are not manifested as torque variations until air has been drawn into a cylinder, compressed, and combusted. Accordingly, the throttle actuator module 116 and phaser actuator module 158 may be slow actuators. Similarly, the boost actuator module 164 and EGR actuator module 172 may be slow actuators. The cylinder actuator module 120 may be a fast actuator or a slow actuator, depending on the manner in which the cylinder actuator module achieves cylinder deactivation, as discussed below.

A torque reserve may be created by setting slow engine actuators to produce a predicted torque, while setting fast engine actuators to produce an immediate torque that is less than the predicted torque. For example, the throttle valve 112 can be opened to increase air flow and prepare the engine 102 to produce the predicted torque. Meanwhile, the spark advance may be retarded to reduce the actual engine torque output to the immediate torque. In other words, the spark timing may be set such that the actual engine torque output is less than the maximum engine torque output that may presently be produced.

The difference between the predicted and immediate torques may create the torque reserve. When a torque reserve is present, the engine torque output can be quickly increased by increasing the immediate torque up to the predicted torque by adjusting the control value for one or more fast actuators. The predicted torque is thereby achieved without waiting for a change in engine torque output to result from an adjustment in the control value for one or more of the slow actuators.

The axle torque arbitration module 204 may output the predicted torque and the immediate torque to a propulsion torque arbitration module 206. In various implementations, the axle torque arbitration module 204 may output the predicted torque and immediate torque to a hybrid optimization module 208. The hybrid optimization module 208 determines how much torque should be produced by the engine 102 and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requestors. For example, all other torque requesters may be informed that they have lost arbitration.

An RPM control module 210 may also output a predicted torque request (Predicted $\text{Torque}_{RPM}$) and an immediate torque request (Immediate $\text{Torque}_{RPM}$) to the propulsion torque arbitration module 206. The torque requests from the RPM control module 210 may prevail in arbitration when the ECM 106 is in an RPM mode. The RPM mode may be selected when the driver removes their foot from the accelerator pedal, such as when the vehicle is idling or coasting down from a higher speed.

Alternatively or additionally, RPM mode may be selected when the predicted torque requested by the axle torque arbitration module 204 is less than a predetermined engine torque value. The engine torque value may be a predetermined torque below which adjustments to the torque reserve according to the present disclosure are desired.

As previously discussed, the torque requests from the RPM control module 210 may be adjusted by the propulsion torque arbitration module 206 based on one or more of the other requests received.

The RPM control module 210 receives a desired engine speed (desired RPM) from an RPM trajectory module 212, and controls the predicted and immediate torque requests output to reduce the difference between the desired engine speed and the actual engine speed. In an exemplary implementation according to the present disclosure, the RPM control module 210 may reduce the difference, referred to hereinafter as engine speed error, by controlling the predicted and immediate torque requests such that the torque reserve is maintained at or near a base torque reserve amount during periods when no unknown impending loads on the engine 102 are detected.

The RPM control module 210 may monitor the engine speed error in order to detect an unknown impending load on the engine 102 that may affect engine torque output. When an unknown impending load is detected, the RPM control module 210 may selectively adjust the predicted and immediate torque requests such that the torque reserve is increased above the base torque reserve amount. In particular, the torque reserve may be increased by a transient torque reserve amount.

In the foregoing manner, the RPM control module 210 may maintain the torque reserve relatively low during periods when no unknown impending loads are detected. The RPM control module 210 may increase the torque reserve at the appropriate time such that torque output may be adjusted to meet unknown impending future loads. In this manner, the engine speed error under engine idle and/or low vehicle speed conditions may be more effectively controlled.

The RPM trajectory module 212 may output a linearly decreasing desired engine speed for vehicle coast down until the desired idle speed is reached. The RPM trajectory module 212 may then continue outputting the desired idle speed as the desired engine speed.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may require retarded spark advance. The reserves/loads module 220 may therefore increase the predicted torque request above the immediate torque request to create retarded spark advance for the cold start emissions reduction process. In another example, the air/fuel ratio of the engine and/or the mass air flow may be directly varied, such as by diagnostic intrusive equivalence ratio testing and/or new engine purging. Before beginning these processes, corresponding torque reserves may be requested in order to create a spark retard. The spark retard can be removed to allow a quick response to decreases in engine torque output that result from leaning the air/fuel mixture during these processes.

The reserves/loads module 220 may also create a torque reserve in anticipation of a known future load, such as the engagement of the A/C compressor clutch. The reserve for A/C compressor clutch engagement may be created when the driver first requests air conditioning. Then, when the A/C compressor clutch engages, the reserves/loads module 220 may add the expected load of the A/C compressor clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T=f(\mathrm{APC},S,I,E,\mathrm{AF},\mathrm{OT},\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored in memory as a lookup table. The torque estimation module 244 may determine APC based on measured MAF and current measured engine RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value) and all cylinders were fueled.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the CPS signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},\mathrm{APC},I,E,\mathrm{AF},\mathrm{OT},\#) \quad (2)$$

This relationship may be embodied as an equation and/or stored in memory as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold and using stoichiometric fueling. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Figure 4:
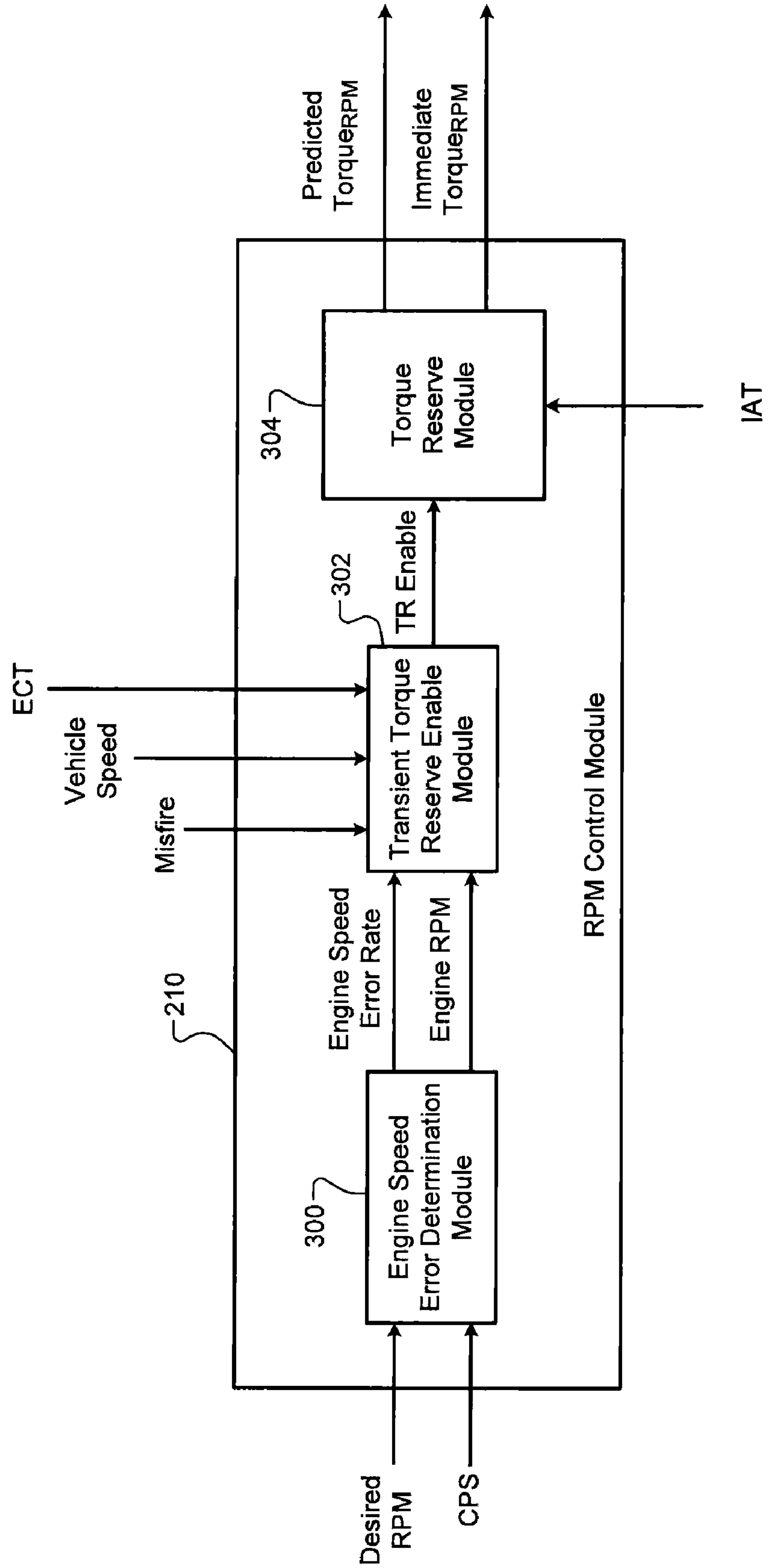
FIG. 4 is a functional block diagram illustrating an exemplary implementation of the RPM control module shown in FIG. 3.

With particular reference to FIG. 4, an exemplary implementation of the RPM control module 210 according to the present disclosure is shown and will now be described. The RPM control module 210 includes an engine speed error determination module 300, a transient torque reserve enable module 302, and a torque reserve module 304. The engine speed error determination module 300 periodically determines an engine speed error rate based on the desired engine speed and the actual engine speed. The actual engine speed may be determined based on the measured rotational speed of the crankshaft. As such, the engine speed error determination module 300 may receive the desired RPM from the RPM trajectory module 212 and the CPS signal generated by the crankshaft position sensor 180. The engine speed error determination module 300 may generate a signal that is output to the transient torque reserve enable module 302 indicating the engine speed error rate.

The engine speed error rate may be determined by periodically calculating the engine speed error and then calculating a difference between successive periodic calculations of the engine speed error. For example, the engine speed error may be calculated every firing period. In other words, in a four-cycle engine, such as the engine 102 disclosed herein, the engine speed error may be calculated every two rotations of the crankshaft. The engine speed error rate may be further calculated based on a period between the successive calculations of the engine speed error. As such, the engine speed error rate may correspond to a time rate of change in the engine speed error.

Figure 5:
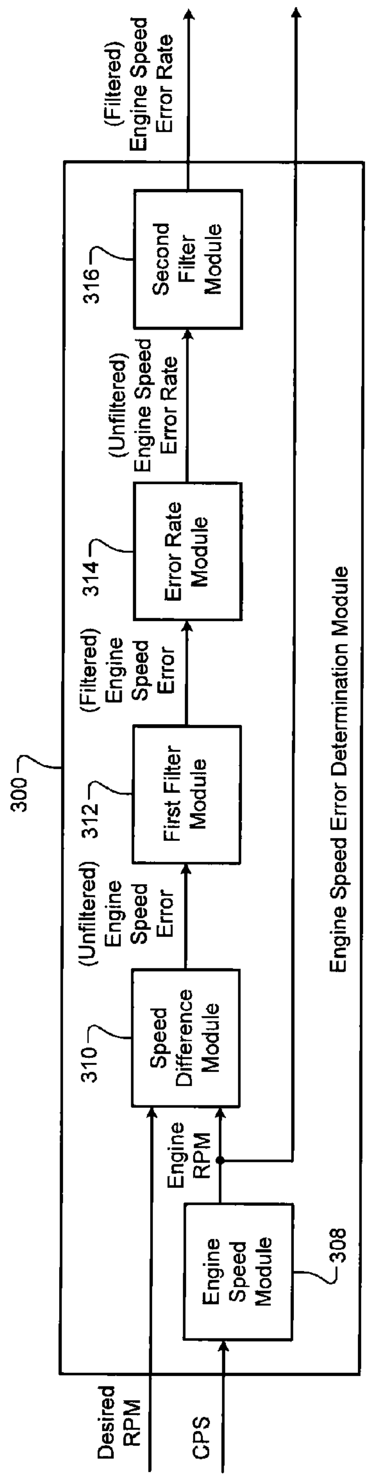
FIG. 5 is a functional block diagram illustrating an exemplary implementation of the engine speed error determination module shown in FIG. 4.

With particular reference to FIG. 5, an exemplary implementation of the engine speed error determination module 300 may include an engine speed module 308, a speed difference module 310, a first filter module 312, an error rate module 314, and a second filter module 316. The engine speed module 308 receives the CPS signal and periodically determines the actual engine speed (engine RPM) based on the CPS signal. The engine speed module 308 outputs a signal indicating the actual engine speed.

The speed difference module 310 receives the desired RPM and the engine RPM signals. The speed difference module 310 periodically determines the engine speed error by calculating a difference between the desired RPM and the actual engine speed indicated by the signals received. The speed difference module 310 outputs a signal indicating the engine speed error. The engine speed error indicated by the signal may be an unfiltered engine speed error as shown in FIG. 5. In other words, the speed difference module 310 may output the engine speed error without applying a filter to successive calculations of the engine speed error.

The first filter module 312 receives the unfiltered engine speed error signal and outputs a filtered engine speed error signal that reduces unwanted noise in the unfiltered engine speed error indicated. As discussed herein, the first filter module 312 applies a first-order lag filter to the unfiltered engine speed error signal when generating the filtered engine speed error signal. As such, the signal output by the first filter module 312 may indicate a filtered engine speed error as shown in FIG. 5.

The error rate module 314 receives the filtered engine speed error signal and periodically determines an engine speed error rate based on the signal received. The error rate module 314 may determine the engine speed error rate by determining a difference between successive values of the filtered engine speed error and the period between the successive values. The error rate module 314 outputs a signal indicating the engine speed error rate indicated by the filtered engine speed error signal. The engine speed error rate indicated by the signal may be an unfiltered engine speed error rate as shown in FIG. 5. In other words, the error rate module 314 may output the engine speed error rate indicated by the signals received without applying a filter to successive calculations of the engine speed error rate.

The second filter module 316 receives the unfiltered engine speed error rate signal and outputs a filtered engine speed error rate signal that reduces unwanted noise in the unfiltered engine speed error rate indicated. As discussed herein, the second filter module 316 applies a first-order lag filter to the unfiltered engine speed error rate signal when generating the filtered engine speed error rate signal. As such, the signal output by the second filter module 316 may indicate a filtered engine speed error rate as shown in FIG. 5.

Referring again to FIG. 4, the transient torque reserve enable module 302 outputs a transient reserve (TR) enable signal indicating whether additional torque reserve is desired to manage an unknown impending load on the engine 102 that may affect engine torque output. In particular, the TR enable signal indicates whether a TR mode is enabled as discussed in further detail below. The transient torque reserve enable module 302 generates the TR enable signal based on the filtered engine speed error rate and one or more operating conditions of the vehicle system 10. The vehicle operating conditions may include vehicle speed, actual engine speed, engine coolant temperature, and whether the engine is misfiring. Accordingly, the transient torque reserve enable module 302 may receive signals indicating various operating conditions of the vehicle system 10 including, but not limited to, vehicle speed, actual engine speed, engine coolant temperature, and engine misfire.

As discussed herein, TR enable signal indicates the TR mode is enabled when all of the following enabling conditions are true: the filtered engine speed error rate is greater than a first threshold error rate, the actual engine speed is less than a threshold speed error, the engine coolant temperature is greater than a threshold coolant temperature, the vehicle speed is less than a threshold vehicle speed, and no misfire has been detected. Engine misfire may be included as an enabling condition to avoid increasing the torque reserve during periods when engine misfire may cause the filtered engine speed error signal to be unreliable.

Once enabling conditions have been met, the TR enable signal may continue to indicate the TR mode is enabled although one or more of the enabling conditions is no longer met. The TR enable signal may switch to indicating the TR mode is disabled when two or more of the foregoing conditions is no longer met. As discussed herein, the TR enable signal switches when the following disabling conditions are met: the filtered engine speed error rate is less than a second threshold error rate and either a misfire has been detected or one or more of the other enabling conditions (e.g., the vehicle speed is less than the threshold vehicle speed) is no longer true.

In general, the first threshold error rate is a predetermined error rate value at or above which an unknown impending load may be causing the calculated rate of change in the engine speed error. The first threshold error rate may be predetermined based on empirical testing of the engine 102 during operation of one or more engine peripherals that may generate an unknown load, such as the power steering pump. The first threshold error rate may further be based on the specifications of the filters applied by the first and second filter modules 312, 216.

The second threshold error rate may be less than the first threshold error rate and may be a predetermined error rate value that provides an acceptable level of hysteresis in the TR enable signal. Hysteresis may be introduced to inhibit unwanted switching in the TR enable signal that may otherwise result from fluctuations in the operating conditions.

The threshold speed error is an engine speed error above which adjustments to the torque reserve according to the present disclosure are not desired. For example only, the threshold speed error may be around 40 RPM.

The threshold coolant temperature may be a predetermined coolant temperature value above which it may be desired to maintain the engine speed at a stable warm idle speed. As an enabling condition, the threshold coolant temperature may be used to avoid enabling torque reserve according to the present disclosure during a short period after a cold engine start when the engine speed is maintained above a warm idle speed. For example only, the threshold coolant temperature may be around 44° C.

The threshold vehicle speed may be a predetermined vehicle speed value greater than zero, below which adjustments to the torque reserve according to the present disclosure are desired. The threshold vehicle speed may be set such that the torque reserve will be managed according to the present disclosure during low speed vehicle maneuvers, such as vehicle parking maneuvers, while engine torque output is low. For example only, the threshold vehicle speed may be around 10 KPH.

With continued reference to FIG. 4, the torque reserve module 304 receives the TR enable signal and the IAT signal and generates the predicted and immediate torque requests that are output by the RPM control module 210 based on the signals received. In particular, when the TR enable signal indicates the TR mode is disabled, the torque reserve module 304 generates the predicted and immediate torque requests such that the torque reserve is maintained at or near the base torque reserve amount.

Conversely, when the TR enable signal indicates the TR mode is enabled, the torque reserve module 304 generates the predicted and immediate torque requests such that the torque reserve is increased at a first predetermined rate up to a predetermined torque reserve value. More specifically, the torque reserve module 304 increases the predicted torque request such that torque reserve is increased by a transient torque reserve amount. The increases in the predicted torque request that accompany the increases in the torque reserve may result in an increase in unmanaged engine torque. The rate at which the torque reserve is increased may be set such that the unmanaged engine torque does not create an unstable condition.

When the TR enable signal switches from indicating the TR mode is enabled to disabled, the torque reserve module 304 generates the predicted and immediate torque requests such that the torque reserve is decreased at a second predetermined rate down to an amount at or near the base torque reserve amount. More specifically, the torque reserve module 304 reduces the transient torque reserve amount at the second predetermined rate. The second predetermined rate may be different than the first predetermined rate. The second predetermined rate may also be set such that an unstable condition is not created while reducing the transient torque reserve amount.

Figure 6:
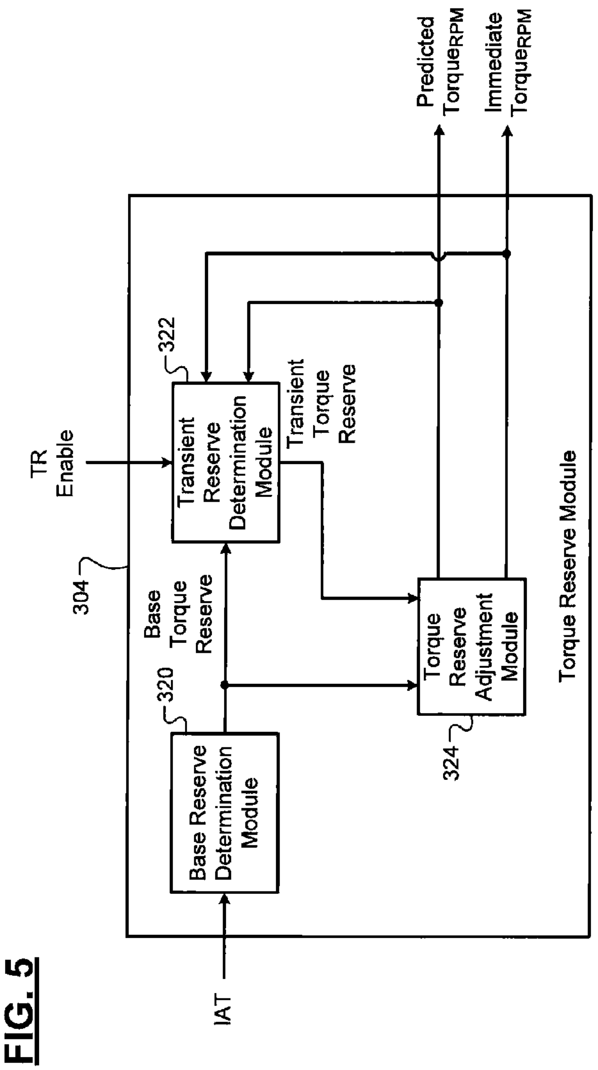
FIG. 6 is a functional block diagram illustrating an exemplary implementation of the torque reserve module shown in FIG. 4.

With particular reference to FIG. 6, an exemplary implementation of the torque reserve module 304 may include a base reserve determination module 320, a transient reserve determination module 322, and a torque reserve adjustment module 324. The base reserve determination module 320 determines the base torque reserve amount and generates a base torque reserve request indicating the amount requested. The base torque reserve request may be output to the transient reserve determination module 322 and the torque reserve adjustment module 324 as shown.

The base torque reserve amount may be a predetermined torque reserve value retrieved from memory by the base reserve determination module 320. A single base torque reserve amount may be stored in memory. For example only, a single base torque reserve amount of around 10 N-m may be suitable.

Alternately, base torque reserve amounts may be stored in a memory table based on one or more ambient conditions. In this manner the base torque reserve amount may be adjusted to compensate for variations in the ambient conditions. The ambient conditions may include the density of the intake air entering the engine 102. In the exemplary embodiment, the base reserve determination module 320 retrieves the base torque reserve amount from memory based on intake air density. The intake air density may be determined based on the intake air temperature. Accordingly, the base reserve determination module 320 may receive the IAT signal as shown.

The base torque reserve amounts may increase as the density of the intake air decreases. For example, at intake air densities above 1.15, the base torque reserve amount may be low at around 6 to 10 N-m. At intake air densities below 1.15, the base torque reserve amount may be increased. The suitable amount of the increase may be predetermined through analysis or empirical testing.

The transient reserve determination module 322 determines the transient torque reserve amount and generates a transient torque reserve request indicating the amount requested. The transient torque reserve request may be output to the torque reserve adjustment module 324 as shown. The transient reserve determination module 322 determines the transient torque reserve amount based on the TR enable signal. The transient reserve determination module 322 generates the transient reserve request such that the predicted and immediate torques requested by the torque reserve adjustment module 324 include the desired transient torque reserve amount. As such, the transient reserve determination module 322 may receive the TR enable, base torque reserve, and predicted and immediate torque signals as shown.

During extended periods when the TR enable signal indicates the TR mode is disabled, the transient reserve determination module 322 requests a transient torque reserve amount at or near zero N-m. When the TR enable signal switches from indicating the TR mode is disabled to enabled, the transient reserve determination module 322 increases the transient torque reserve amount requested at a first predetermined rate up to a predetermined maximum transient torque reserve amount. In particular, the transient reserve determination module 322 increases the transient torque reserve amount at a first transient reserve rate. As such, the transient torque reserve amount requested may increase during a period following the switch in the TR enable signal. The transient torque reserve amount requested may not reach the maximum transient torque reserve amount if the TR enable signal switches again (i.e., the TR mode is disabled) during the period in which the transient torque reserve amount is being increased.

When the TR enable signal switches from indicating the TR mode is enabled to disabled, the transient reserve determination module 322 decreases the transient torque reserve amount requested at a second predetermined rate down to amount at or near zero N-m. In particular, the transient reserve determination module 322 decreases the transient torque reserve amount at a second transient reserve rate. As such, the transient torque reserve amount requested may decrease during a period following the switch in the TR enable signal. The transient torque reserve amount requested may not reach zero if the TR enable signal switches again (i.e., the TR mode is enabled) during the period in which the transient torque reserve amount is being decreased.

The first and second transient reserve rates and maximum transient torque reserve amount each may be a single value retrieved from memory by the transient reserve determination module 322. Alternately, one or more of the first and second transient reserve rates and maximum transient torque reserve amount may be stored in a corresponding memory table based on one or more ambient and/or engine operating conditions. In this manner the first and second transient reserve rates and maximum transient torque reserve amount may be adjusted to compensate for variations in the conditions. Additionally, the first and second transient reserve rates may be different.

In the exemplary embodiment, the first and second transient reserve rates and maximum transient torque reserve amount each are a single value retrieved from memory. For example, a maximum transient torque reserve amount equal to around 15 N-m may be suitable.

The torque reserve adjustment module 324 receives the base and transient torque reserve requests and generates the predicted and immediate torque requests based on the requests received. In particular, the torque reserve adjustment module 324 may generate the predicted and immediate torque requests such that the torque reserve requested is equal to the sum of the base torque reserve amount and the transient torque reserve amount requested. During periods when the torque reserve is changing as a result of an increase or decrease in the requested transient torque reserve amount, the torque reserve adjustment module 324 may adjust the torque reserve by adjusting the predicted torque request.

When generating the predicted and immediate torque requests, the torque reserve adjustment module 324 may implement a check to see whether the torque reserve can be achieved. When the torque reserve cannot be achieved, the torque reserve adjustment module 324 may adjust the predicted torque request such that the torque reserve requested may be achieved. In various implementations, the check to see whether the torque reserve may be performed by other modules, such as the actuation module 224.

Figure 7:
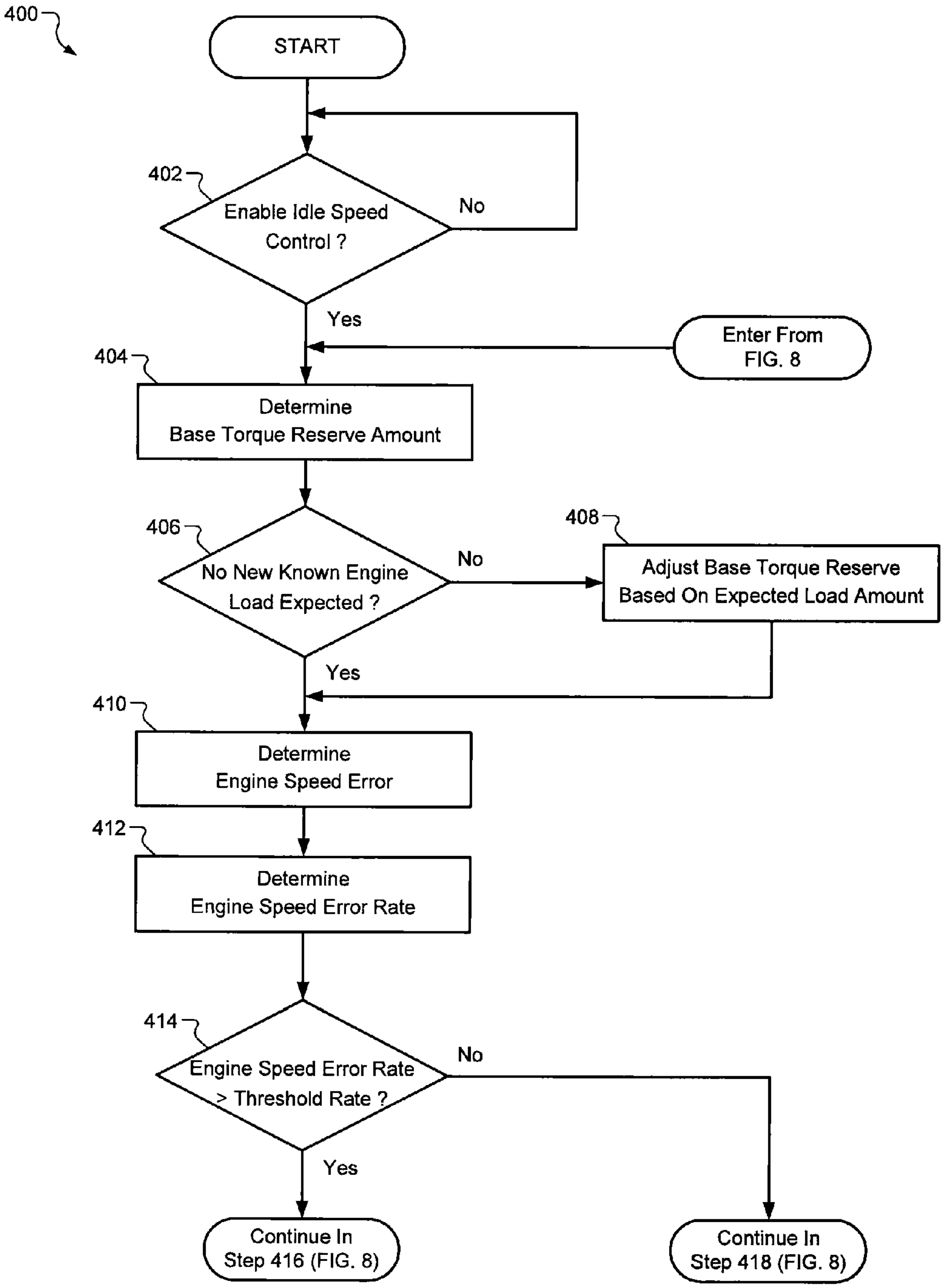
FIG. 7 is a partial flow diagram illustrating exemplary steps in a method for controlling a torque reserve of an engine according to the present disclosure.
Figure 8:
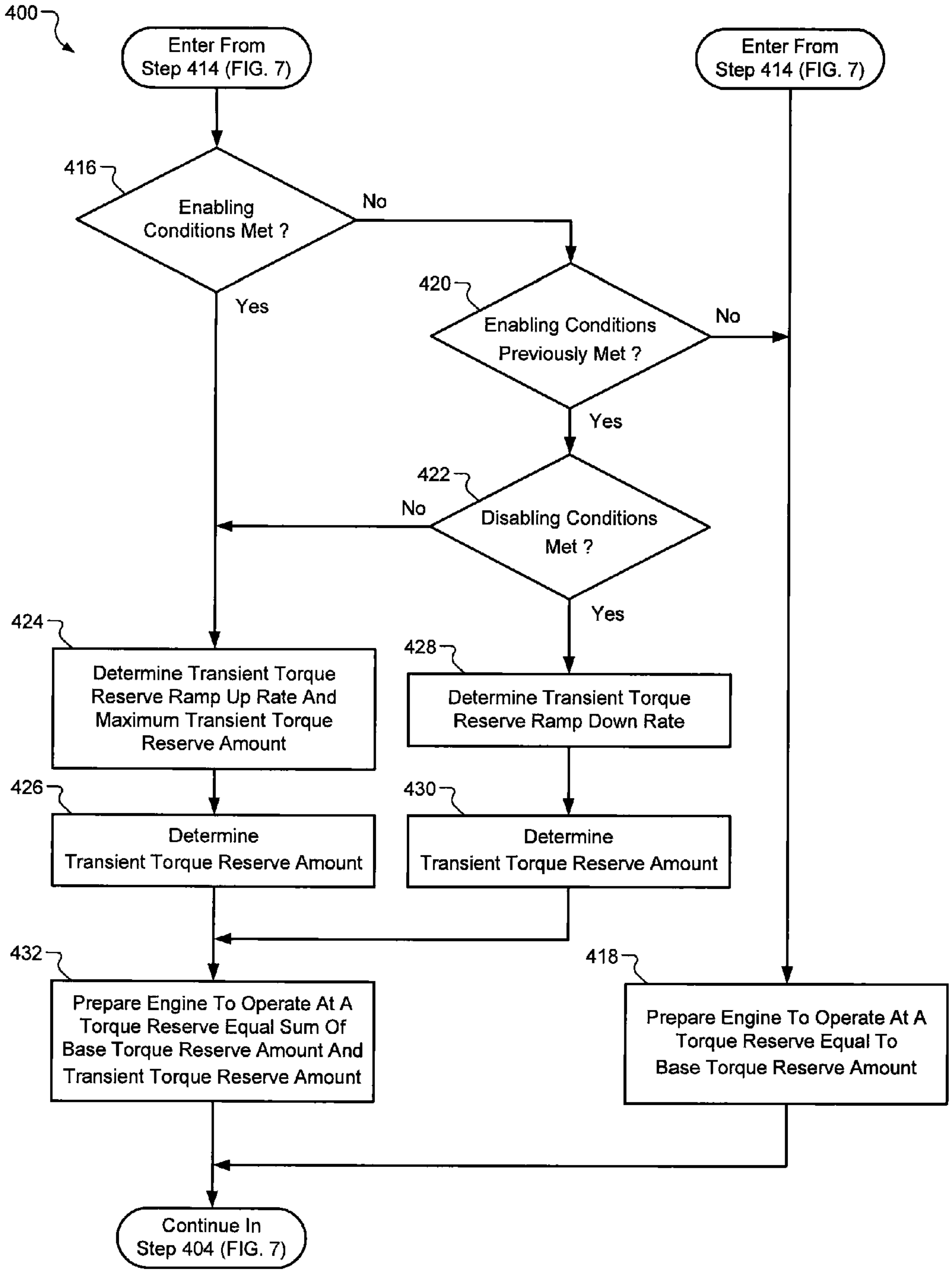
FIG. 8 is a partial flow diagram illustrates additional exemplary steps in the method for controlling the torque reserve of the engine according to the present disclosure.

With particular reference to FIGS. 7-8, an exemplary method 400 for controlling the torque reserve of an engine during idle speed control according to the present disclosure is presented. The method 400 may be implemented in one or modules of an engine system, such as the RPM control module 210 of the engine system 12 described above. The method 400 may be run periodically during operation of the engine.

Control under the method begins in step 402 where control determines whether to enable idle speed control for the current control loop. While control enables idle speed control, control continues in steps 404-432 in a periodic manner as discussed in further detail below, otherwise control loops back as shown. Control may enable idle speed control when the driver removes their foot from the accelerator pedal, such as when the vehicle is idling or coasting down from a higher speed. Alternatively or additionally, control may enable idle speed control when the predicted torque output of the engine is less than a predetermined engine torque value.

In step 404, control determines a base torque reserve amount for the current control loop. The base torque reserve amount may be a single predetermined torque reserve amount sufficient under the method 400. Alternately, the base torque reserve amount may vary based on one or more ambient conditions, such as the density of intake air entering the engine. As such, the base torque reserve amount may vary based on a measured intake air temperature. For example, the base torque reserve amount at intake air densities below 1.15 may be greater than the base torque reserve amount at intake air densities above 1.15.

Control proceeds in step 406 where control determines whether a new known engine load is expected. If a new known engine load is expected, control proceeds in step 408, otherwise control proceeds in step 410. A new known engine load may be expected when, for example, the driver has requested A/C since control last entered step 406 (e.g., last control loop) and the A/C clutch will be engaged to meet the request.

In step 408, control adjusts the current base torque reserve amount based on an expected load amount of the new known engine load. For example, control may increase the current base torque reserve amount by an amount up to and including the expected load amount.

Control proceeds in step 410 where control determines an engine speed error for the current control loop. The engine speed error may be determined by calculating a difference between a current desired engine speed and a current actual (i.e., measured) speed of the engine. The engine speed error may be further determined by applying a filter to the engine speed error determined in successive periodic calculations to reduce unwanted noise in the difference. For example, a first-order lag filter may be applied to the calculated difference. As such, in step 410, control may determine a filtered engine speed error. Control may store the engine speed error for the current control loop in memory for retrieval in subsequent control steps and/or control loops.

Control proceeds in step 412 where control determines an engine speed error rate for the current control loop. The engine speed error rate may be determined by calculating a difference between the current engine speed error and the engine speed error determined in the last periodic calculation and dividing the difference by the period between the calculations. The engine speed error rate may be further determined by applying a filter to the engine speed error rate determined in successive calculations to reduce unwanted noise in the calculated rate. For example, a first-order lag filter may be applied to the calculated rate. As such, in step 412, control may determine a filtered engine speed error rate. Control may store the engine speed error rate for the current control loop in memory for retrieval in subsequent control steps and/or control loops.

Control proceeds in step 414 where control compares the current engine speed error rate and a threshold error rate. Control compares the engine speed error rate and the threshold error rate in order to detect whether an unknown future load on the engine is anticipated and therefore additional torque reserve may be desired to manage the unknown impending load. If the current engine speed error rate is greater than the threshold error rate, then control proceeds in step 416 (FIG. 8). Otherwise, control proceeds in step 418 (FIG. 8) where control prepares the engine to operate at a torque reserve equal to the current base torque reserve amount and control returns in step 404 (FIG. 7) as shown to begin another control loop. From step 418, control returns in step 404 as shown while idle speed control is enabled in step 402 as previously described.

The threshold error rate may be a predetermined error rate value indicative of an unknown impending load. Unknown impending loads may be generated by one or more components driven by the engine that operate independent of control and/or for which there is no sensor that senses the operation of the component. For example, a power steering pump may be driven by the engine. In systems where there is no pressure sensor to sense the output pressure of the power steering pump, the pump may impart a load on the engine without warning in response to driver inputs.

The threshold error rate may be predetermined through analysis or empirical testing of the engine by operating such components and observing the effect on the engine speed error rate when the engine is operated at the base torque reserve amount. The threshold error rate may further be determined based on the filters applied to the periodic engine speed error calculations and engine speed error rate calculations performed in steps 410 and 412, respectively.

In step 416, control determines whether enabling conditions for increasing the torque reserve are met. If the enabling conditions are met, then control proceeds in steps 424 as discussed in further detail below. If the enabling conditions are not met then control proceeds in step 420. For example only, the enabling conditions may be met when all of the following enabling conditions are true: the engine speed error rate is greater than a first threshold error rate, the engine speed error is less than a threshold speed error, the engine coolant temperature is greater than a threshold coolant temperature, the vehicle speed is less than a threshold vehicle speed, and no misfire has been detected.

In step 420, control determines whether the enabling conditions were previously met. If the enabling conditions were previously met, then control proceeds in step 422, otherwise control continues in step 418 where control prepares the engine to operate at a torque reserve equal to the current base torque reserve amount and control returns in step 404 (FIG. 7) as shown to begin another control loop. From step 418, control returns in step 404 as shown while idle speed control is enabled in step 402 as previously described.

In step 422, control determines whether disabling conditions are met. If the disabling conditions are met, then control proceeds in steps 428 as discussed in further detail below, otherwise control proceeds in steps 424. For example only, the disabling conditions may be met when the following disabling conditions are true: the filtered engine speed error rate is less than a second threshold error rate and either a misfire has been detected or one or more of the other enabling conditions (e.g., the vehicle speed is less than the threshold vehicle speed) is no longer true.

The second threshold error rate may be less than the first threshold error rate to inhibit unwanted frequent excursions between control under step 418 and control under step 432 from step 416. The second threshold error rate may also be suitably set to inhibit unwanted excursions between control under steps 424-426 and control under steps 428-430. Unwanted excursions may result from cyclical fluctuations in the engine speed error rate around the first threshold error rate between successive control loops. Such excursions may be inhibited to avoid frequent changes to the torque reserve at which the engine is prepared to operate and the corresponding unmanaged torque that may result.

Control may proceed in step 424 from one of steps 416 and 422 as discussed above. In step 424, control determines a transient torque reserve ramp up rate and a maximum transient torque reserve amount that is used to determine a transient torque reserve amount in the subsequent step 426. The transient torque reserve ramp up rate may be a predetermined rate at which the transient torque reserve amount is increased in step 426 while control continues in steps 424-426 in the current and subsequent control loops. The maximum transient torque reserve amount may be a predetermined torque reserve value corresponding to the maximum transient torque reserve amount determined in step 426.

In step 426, control determines the transient torque reserve amount for the current control loop based on the transient torque reserve amount of the previous control loop, the transient torque reserve ramp up rate, and the maximum transient torque reserve amount. In particular, control determines the transient torque reserve amount such that while control continues in steps 424-426 in the current and subsequent control loops, the transient torque reserve amount is increased at the transient torque reserve ramp up rate up to the maximum transient torque reserve amount. As such, it will be appreciated that where control does not continue in steps 424-426 for a sufficient period (i.e., number of control loops), the transient torque reserve amount determined in step 426 may not reach the maximum transient torque reserve amount.

Control may proceed in step 428 from step 422 as discussed above. In step 428, control determines a transient torque reserve ramp down rate that is used to determine a transient torque reserve amount in the subsequent step 430. The transient torque reserve ramp down rate may be a predetermined rate at which the transient torque reserve amount is decreased in step 430 while control continues in steps 428-430 in the current and subsequent control loops. The transient torque reserve ramp up rate may be different than the transient torque reserve ramp down rate.

In step 430, control determines the transient torque reserve amount for the current control loop based on the transient torque reserve amount of the previous control loop and the transient torque reserve ramp down rate. In particular, control determines the transient torque reserve amount such that while control continues in steps 428-430 in the current and subsequent control loops, the transient torque reserve amount is decreased at the transient torque reserve ramp down rate down to a transient torque reserve amount equal to zero. As such, it will be appreciated that where control does not continue in steps 428-430 for a sufficient period, the transient torque reserve amount determined in step 430 may not reach zero.

In step 432, control prepares the engine to operate at a torque reserve equal to the sum of the base torque reserve amount and the transient torque reserve amount determined in the current control loop. Control may prepare the engine to operate at a torque reserve above the base torque reserve amount in order to manage a load that has been anticipated based on a comparison of the engine speed error rate and the threshold error rate in step 414. During periods when control continues in step 432 from step 426, control may increase the torque reserve of the engine to manage the onset of the load. During periods when control continues in step 432 from step 430, control may decrease the torque reserve of the engine when the load is no longer anticipated or is passing.

Control may implement a check to see that the engine may operate at a torque reserve equal to the sum of the base torque reserve amount and the transient torque reserve amount. Based on the check, control may prepare the engine to operate at a torque reserve less than the sum to ensure stable operation of the engine. From step 432, control returns in step 404 (FIG. 7) as shown to begin another control loop. Control returns in step 404 while idle speed control is enabled in step 402 as previously described.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine comprising:

a speed error determination module that periodically determines an engine speed error rate based on a difference between a measured speed of said engine and a desired speed of said engine; and a torque reserve module that:

selectively adjusts a torque reserve of said engine based on said engine speed error rate, wherein said torque reserve is a difference between a predicted torque and an immediate torque, and wherein said torque reserve indicates a present maximum capability to increase said immediate torque;

maintains said torque reserve at a first torque reserve amount while said engine speed error rate is less than a first error rate;

increases said torque reserve above said first torque reserve amount at a first predetermined rate when said engine speed error rate increases above said first error rate; and subsequently decreases said torque reserve at a second predetermined rate when said engine speed error rate decreases below said first error rate.

2. The control system of claim 1 wherein said torque reserve module limits said torque reserve to a second torque reserve amount greater than said first torque reserve amount.

3. The control system of claim 1 wherein said first torque reserve amount is based on a density of intake air of said engine.

4. The control system of claim 1 wherein said torque reserve module increases said torque reserve above said first torque reserve amount when enablement conditions are met, and wherein said enablement conditions include one of a group consisting of said measured speed of said engine, an engine coolant temperature, a vehicle speed, and a misfire condition of said engine.

5. The control system of claim 1 wherein said torque reserve module selectively increases said torque reserve between a said first torque reserve amount and a sum of said first torque reserve amount and a second torque reserve amount during a first period beginning when said engine speed error rate increases above said first error rate and ending when said engine speed error rate decreases below a second error rate less than said first error rate, and decreases said torque reserve during a second period after said first period.

6. The control system of claim 1 wherein said engine speed error rate is determined every firing period of said engine.

7. The control system of claim 1 wherein said difference is a filtered difference, and wherein said engine speed error rate is a filtered engine speed error rate.

8. The control system of claim 1 wherein torque reserve module adjusts the first torque reserve amount in inverse proportion to an intake air density.

9. A method for an engine comprising:

periodically determining an engine speed error rate based on a difference between a measured speed of said engine and a desired speed of said engine;

monitoring said engine speed error rate;

selectively adjusting a torque reserve of said engine based on said engine speed error rate, wherein said torque reserve is a difference between a predicted torque and an immediate torque, and wherein said torque reserve indicates a present maximum capability to increase said immediate torque;

maintaining said torque reserve at a first torque reserve amount while said engine speed error rate is less than a first error rate;

increasing said torque reserve above said first torque reserve amount at a first predetermined rate when said engine speed error rate increases above said first error rate; and subsequently decreasing said torque reserve at a second predetermined rate when said engine speed error rate decreases below said first error rate.

10. The method of claim 9 wherein said increasing said torque reserve above said first torque reserve amount includes limiting said torque reserve to a second torque reserve amount greater than said first torque reserve amount.

11. The method of claim 9 wherein said first torque reserve amount is based on a density of intake air of said engine.

12. The method of claim 9 wherein said increasing said torque reserve above said first torque reserve amount includes increasing said torque reserve above said first torque reserve amount when enablement conditions are met, and wherein said enablement conditions include one of a group consisting of said measured speed of said engine, an engine coolant temperature, a vehicle speed, and a misfire condition of said engine.

13. The method of claim 9 wherein said selectively adjusting said torque reserve of said engine includes:

increasing said torque reserve between said first torque reserve amount and a sum of said first torque reserve amount and a second torque reserve amount during a first period beginning when said engine speed error rate increases above said first error rate and ending when said engine speed error rate decreases below a second error rate less than said first error rate, and decreasing said torque reserve during a second period after said first period.

14. The method of claim 9 wherein said engine speed error rate is determined every firing period of said engine.

15. The method of claim 9 wherein said difference is a filtered difference, and wherein said engine speed error rate is a filtered engine speed error rate.

16. The method of claim 9 further comprising adjusting the first torque reserve amount in inverse proportion to an intake air density.

* * * * *